United States Patent [19]

Pardes

[11] Patent Number: 5,092,855
[45] Date of Patent: Mar. 3, 1992

[54] ENCLOSING SLEEVE FOR ONE-WAY VALVE

[75] Inventor: Greg Pardes, New York, N.Y.

[73] Assignee: ReSeal International Limited Partnership, N.Y.

[21] Appl. No.: 467,990

[22] Filed: Jan. 22, 1990

[51] Int. Cl.⁵ .............................. A61M 5/005
[52] U.S. Cl. ..................... 604/247; 137/853; 222/494
[58] Field of Search ............ 604/9, 10, 163, 213, 604/247, 255–7, 263, 335; 222/490, 494; 137/853, 860; 215/317, 320, 355

[56] References Cited

U.S. PATENT DOCUMENTS

| | | | |
|---|---|---|---|
| 2,107,596 | 2/1938 | Bardon | 137/853 |
| 2,655,178 | 10/1953 | Sarosdy | 137/853 |
| 3,607,098 | 9/1971 | Strande | 215/317 |
| 4,254,791 | 3/1981 | Bron | 137/853 |
| 4,568,333 | 2/1986 | Sawyer et al. | 137/860 |
| 4,722,731 | 2/1988 | Vailancourt | 137/860 |
| 4,846,810 | 7/1989 | Gerber | 604/247 |

*Primary Examiner*—C. Fred Rosenbaum
*Assistant Examiner*—Chalin Smith
*Attorney, Agent, or Firm*—Toren, McGeady & Associates

[57] ABSTRACT

An enclosing sleeve for a one-way valve presses an elastomeric sheath against the valve body to provide a seal between the sheath and the valve body. In addition, the sleeve can form a closure over the outlet end of the valve body protecting it from contamination or contact with contaminating surfaces.

21 Claims, 3 Drawing Sheets

ENCLOSING SLEEVE FOR ONE-WAY VALVE

BACKGROUND OF THE INVENTION

The present invention is directed to a sleeve for enclosing a one-way valve formed in part by a resilient membrane or sheath for limiting the extent to which the membrane is expandable, and for assisting in providing a seal between the sheath and the body of the valve.

The Gerber U.S. Pat. No. 4,846,810, for a valve assembly, discloses, in FIG. 4, a tubular section or sleeve for restraining the radially outward movement of a flexible sheath. The Gerber Patent does not disclose the manner in which the tubular member or sleeve is supported relative to the one-way valve or to a container in which the valve is secured.

SUMMARY OF THE INVENTION

Therefore, the primary object of the present invention is to provide a sleeve enclosing a one-way valve as in the Gerber Patent for limiting expansion of the flexible membrane or sheath on the valve body and, at the same time, assisting in sealing the membrane to the valve body, and protecting the valve.

In accordance with the present invention, in the valve, as disclosed in the Gerber Patent, the sleeve can be used to press the O-rings into sealing contact with the membrane.

In an alternative arrangement, the sleeve can be used to replace the O-rings by providing annular inwardly directed protuberances on the sleeve for pressing the membrane into sealing contact with the surface of the valve body.

In a preferred embodiment, the sleeve has a hole formed through it for venting the space between the membrane and the sleeve in the region where the membrane is sealed to the valve body.

In still another preferred arrangement, the sleeve replaces the O-rings and seals the membrane to the valve body at two spaced locations. Further, the sleeve secures the membrane in place at an opening out of the container in which the one-way valve is used.

For maintaining the integrity of the one-way valve and limiting the contact of contaminants or contaminating surfaces with the valve outlet, the end of the sleeve forms a cover over the valve outlet. The cover has an opening so that fluid from the valve outlet can be dispensed. The opening can be shaped and sized to control the manner in which the fluid is dispensed, such as in a directed spray, a mist, or another desired form.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
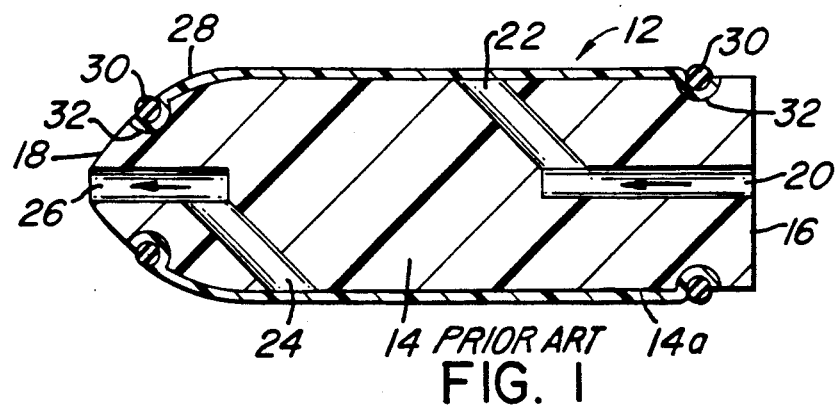
FIG. 1 is an axially extending sectional view of the one-way valve disclosed in the Gerber Patent.

In FIG. 1, a one-way valve assembly 12 is illustrated, including a valve body 14, elongated in the axial direction, extending between an inlet or first end 16 and an outlet or second end 18. When the valve body 14 is placed on a dispensing container, the inlet end 16 communicates with the interior of the container holding the fluid to be dispensed.

A first channel 20 extends axially from the inlet end 16 for a portion of the axial length of the valve body 14. As viewed in FIG. 1, the first channel extends for approximately one-third of the length, however, this is merely for purposes of illustration and the first channel can be of a significantly different length.

At its end, opposite the inlet end 16, the first channel opens into one or more first ports 22, extending angularly outwardly to the outside surface 14a of the valve body 14 from the first channel 20. In FIG. 1, only a single port 22 is displayed.

Spaced toward outlet end 18 of the valve body 14 is a port 24 extending inwardly from the outside surface 14a at an angle to the axial direction and terminating at one end of an outlet channel 26. A plurality of ports 24 could be used. As shown, the first and second channels are spaced apart in the axial direction. It is significant that the first and second channels are not in flow communication within the valve body 14.

Encircling the outside surface 14a of the valve body is an elastomeric sheath or tubular membrane 28. The sheath extends from adjacent the inlet end 16 to adjacent the outlet end 18 of the valve body 14. The important feature is that the sheath 28 covers the first port 22 and the second port 24. At each of its ends, the sheath 28 is sealed against the outside surface 14a of the valve body by means of an O-ring-like member 30. The sheath fits tightly about the valve body forming a sealed closure of the openings of the first and second ports 22, 24, through the outside surface of the valve body 14. The O-ring members 30 press the sheath into grooves 32 in the outside surface 14a of the valve body so that a seal is formed between the sheath and the valve body.

As mentioned in the Gerber Patent, the sheath can also be sealed to the valve body by thermal or chemical bonding operations or by the use of adhesives.

Figure 4:
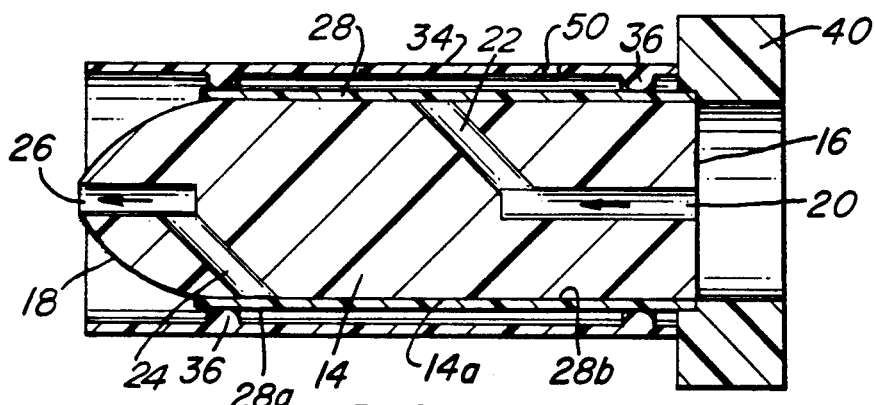
FIG. 4 is an axially extending sectional view, similar to FIGS. 2 and 3, with the sleeve securing the membrane at the connection to a dispensing container.

In FIG. 4 of the Gerber Patent, a sleeve 34 is shown enclosing the sheath 28 on the valve body, however, as illustrated, it does not provide any support for the means holding the sheath in sealed engagement with the valve body.

In the following description, the reference numerals of FIG. 1 are used.

Figure 2:
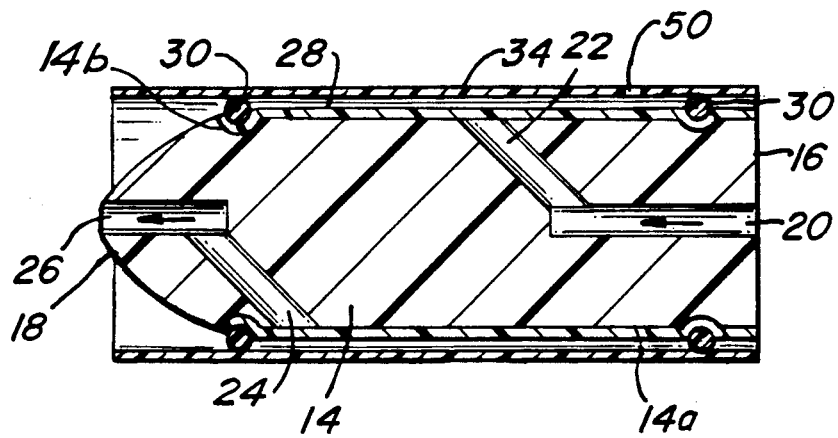
FIG. 2 is an axially extending sectional view of a sleeve embodying the present invention for securing O-rings, as shown in FIG. 1, on the valve body.

In FIG. 2, O-ring members 30 are seated into annular grooves formed in the outside surface 14a of the valve body 14. The sleeve 34 fits over and presses the O-rings into the grooves 14b in the surface 14a of the valve body. While the material of the O-rings 30 affords a sealing action of the sheath 28 with the outside surface 14a, the compressing action provided by the sleeve 34 against the O-rings assures that the sealing action of the sheath with the valve body is maintained.

When the sleeve and one-way valve arrangement shown in FIG. 2 is to be used, fluid within a dispensing container is directed through the first channel 20 and the port 22 into the space between the outside surface 14a of the valve body 14 and the inside surface of the sheath 28. The pressure acting on the fluid presses the membrane outwardly from the surface 14a, permitting it to flow between the outside surface of the valve body and the inside surface of the sheath 28 to the second port 24. The space between the ports 22, 24 is sealed by the combination of the sleeve 34, O-rings 30, and the sheath 28. The fluid flows through the port 24 into the second channel 26 and is dispensed from the outlet end 18 of the valve body. After the fluid has been dispensed from the outlet end 18 of the valve body, the sheath returns to its position tightly enclosing the valve body and blocking any flow back through the second channel 26 and the second port 24 with the space between the sheath and the valve body. The O-rings 30, in combination with the sleeve 34, assure that the sheath is sealed about the valve body 14 so that contamination in the form of air or other impurities cannot find its way between the sheath and the valve body into the first port 22, and the first channel 20 and, finally, into the container itself. It is significant that a seal is maintained between the sheath and the valve body for preventing any backflow of contaminants into the dispensing container.

Figure 2A:
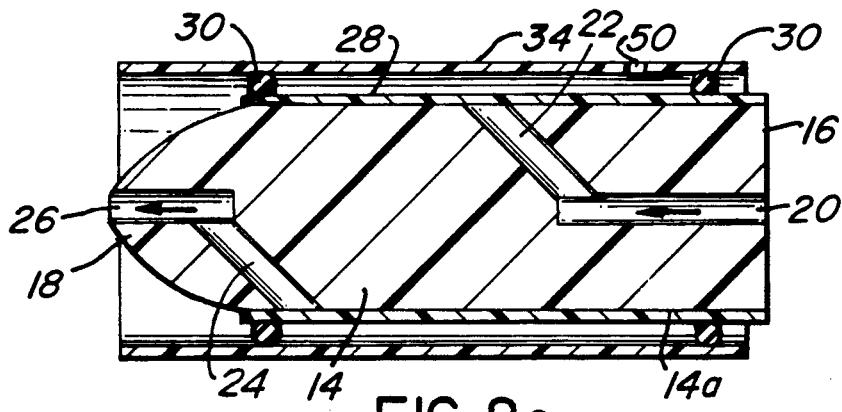
FIG. 2a is a view similar to FIG. 2, however, without grooves for seating the O-rings.

In FIG. 2a, the arrangement is similar to that in FIG. 2, however, there are no grooves formed in the outside surface 14a of the valve body 14 for receiving the O-rings 30. Instead, the O-rings 30 are pressed radially inwardly by the sleeve 34 against the outside surface of the sheath 28, directing the sheath into sealing contact with the outside surface 14a of the valve body. The inside surface of the sleeve can have annular grooves, not shown, to receive, and hold the O-rings.

Figure 3:
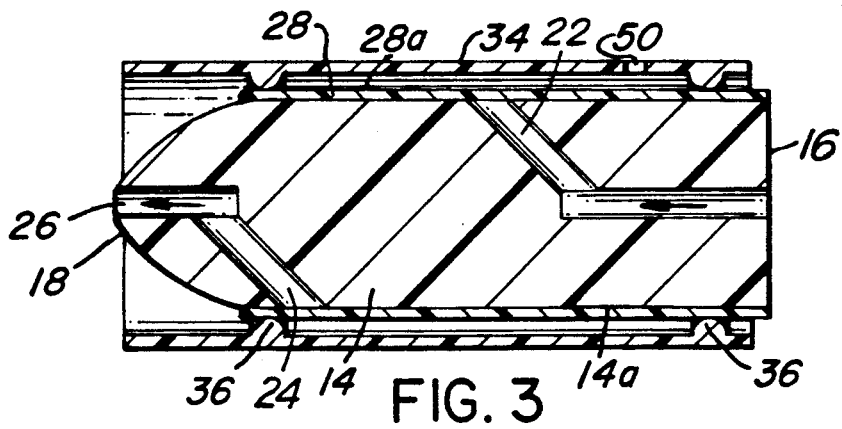
FIG. 3 is an axially extending sectional view, similar to FIGS. 2 and 2a, however, with the sleeve replacing the O-rings.

In FIG. 3, in place of the O-rings 30, protuberances 36 are provided on the inside surface of the sleeve 34 projecting into pressure-applying contact with the outside surface 28a of the sheath 28. The protuberances are sized to press the sheath radially inwardly into sealing contact with the valve body 14.

In FIG. 3, the outside surface 14a of the valve body 14 is not grooved to receive the inwardly pressed sheath, however, the outside surface of the valve body can be grooved to receive the sheath pressed inwardly by the protuberances 36.

Further, while the outlet end of the valve body has a ogive-like configuration, it can also be provided with a more flattened shape, so that the protuberances 36 can be moved closer to the ends of the sleeve 34. As compared with the arrangement in FIGS. 2 and 2a where O-rings are used in combination with the sleeve, in FIG. 3 the arrangement of the sleeve 34 and the inwardly extending protuberances 36 afford a more simplified sealing action between the sheath 28 and the valve body 14.

Figure 7:
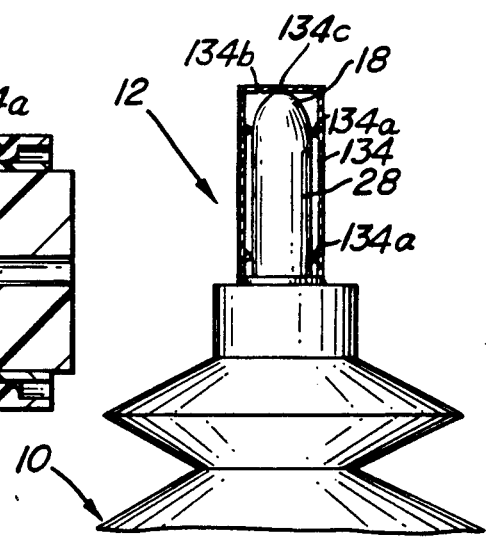
FIG. 7 is a perspective view of the sleeve secured on the one-way valve, with the one-way valve attached to a dispensing container outlet.

FIG. 4 shows a stopper 40 for securing the outlet valve 12 into a container. The container, not shown, may be of a variety of types, preferably a collapsible container, such as shown in FIG. 7.

In FIG. 4, a protuberance 36 is provided adjacent the outlet end 17 of the valve body, pressing inwardly against the outside surface 28a of the sheath 28 to provide a sealing effect between the sheath and the outside surface 14a of the valve body 14. Adjacent the inlet end 16 of the valve body, however, a protuberance is not used, and the sheath is extended into the stopper 40. The stopper 40 is formed of a resilient material so that it can be wedged in a sealed manner into an outlet opening from the container holding the material to be dispensed. Further, the stopper secures the end of the sheath 28 at the inlet end of the valve body 14 in sealed contact with the valve body. As a result, the sheath 28 is held in sealed contact with the outside surface 14a of the valve body so that air or other contaminating elements cannot flow into the space between the valve body and the sheath during use of the one-way valve 12. Accordingly, the space between the outside surface 14a of the valve body and the inside surface 28b of the sheath is sealed in the range of the ports 22, 24 whereby flow out of the dispensing container can be effected through the valve body 14 and the outlet 26, however, backflow through the outlet 26 to the space between the valve body and the sheath is prevented by the sealing action of the sheath against the outside surface 14a of the valve body.

Figure 5:
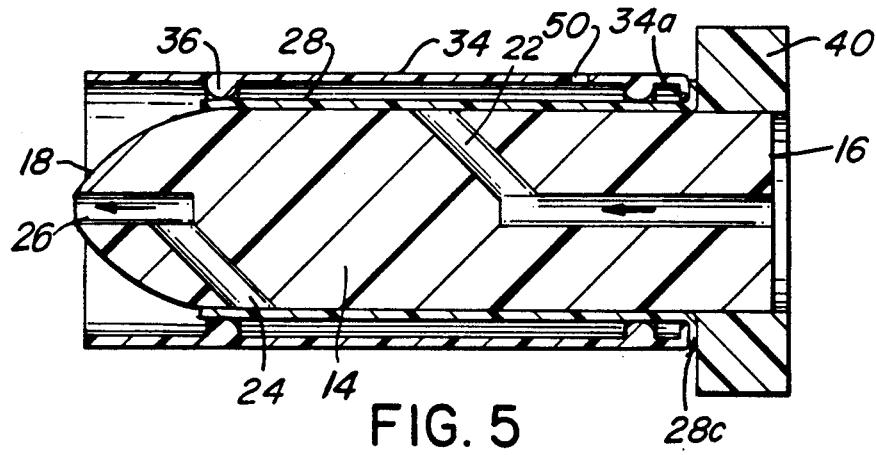
FIG. 5 is a sectional view similar to FIG. 4 with a different arrangement of the sleeve and valve secured to a dispensing container.

In FIG. 5, another sealing arrangement is shown, similar to FIG. 4, where a protuberance 36, formed on the inside surface of the sleeve 34, presses the sheath 28 into sealing contact with the outside surface 14a of the valve body 14. The protuberance 36 is located adjacent the outlet end of the valve body 14 or between the outlet end and the port.

At the inlet end of the valve body, a stopper 40 is provided around the end of the valve body and is used for sealing the valve into a dispensing container, not shown. At its end adjacent the stopper 40, sheath 28 is provided with an annular outwardly directed flange 28c. The flange 28c bears against the adjacent radially outwardly extending surface of the stopper 40. The end 34a of the sleeve 34 is flanged inwardly so that the flanged end 28c of the sheath 28 is held in sealed engagement between the flanged end 34a of the sleeve 34 and the surface of the stopper 40. Accordingly, the space between the sheath 28 and the outside surface 14a of the valve body 14 is maintained sealed against any inflow of contaminants. As a result, contamination cannot enter through the one-way valve 12 between the sheath and the outside surface of the valve body or through the outlet 26 into the space between the sheath and the valve body.

In each of FIGS. 2, 2a, 3, 4 and 5, a hole 50 is provided through the sleeve 34 opening into the sealed space between the sheath and the valve body extending axially between the O-rings, protuberances or other seals. As a result, if the sheath 28 is expanded outwardly into contact with the inside surface of the sleeve 34, it is possible for the sheath to rebound into sealing contact with the outside surface 14a of the valve body 14.

Figure 6:
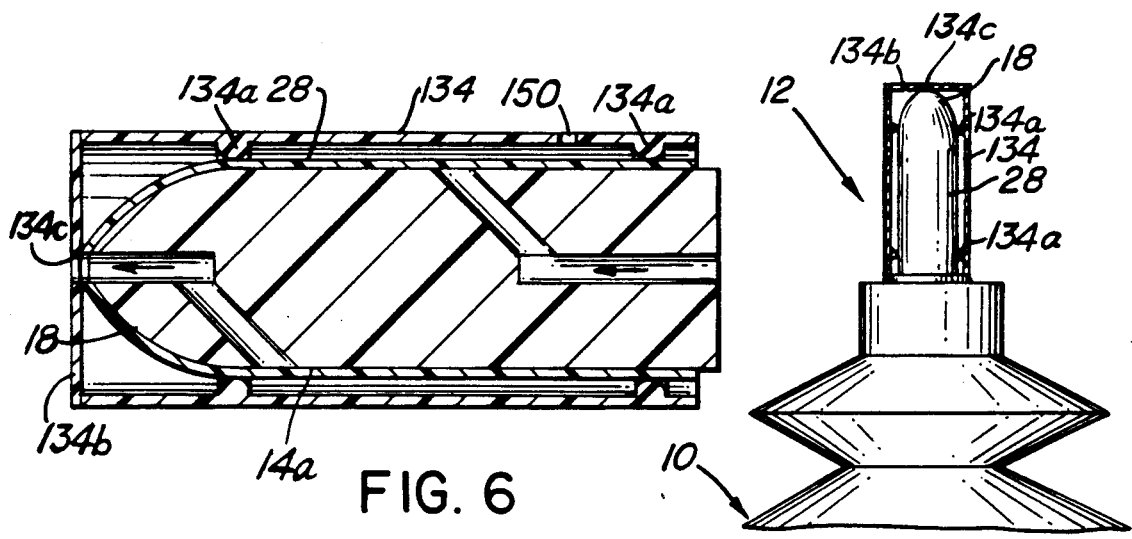
FIG. 6 is an axially extending sectional view of another configuration of the enclosing sleeve.

In FIG. 6, sleeve 134 has a plate-like closure or cover 134b at its end adjacent the outlet end 18 of the valve body. The sleeve 134 is shown sealing the membrane or sheath 28 against the outside surface 14a of the valve body. While protuberance 134a forces the sheath 28 against the valve body, any of the various arrangements of the sleeve 34 described above can be used to seal the sheath against the valve body. Cover 134b protects the outlet end 18 of the valve body from contact with contaminants or contaminated surfaces. The sheath 28 extends to the outlet end of the outlet channel 26. The sheath bears against the inside of the cover 134b and the outside of the valve body 14 forming a seal preventing any flow of the fluid between the sleeve and the sheath and between the sheath and the valve body.

An opening 134c extends through the cover 134b so that fluid can flow from the one-way valve 12 through the sleeve cover 134b. The opening 134c is shaped to regulate the flow of fluid dispensed. It can be configured to form a mist, a spray, a single stream or any other desired fluid dispensing form. The axially extending surfaces forming the opening 134c can be in divergent, convergent, or in axially parallel relation. Further, a plurality of openings 134b could be used. A vent opening 150 is located in the sleeve 134.

FIG. 7 displays the combination of the sleeve 134 and one-way valve 12 of the present application secured in the outlet of a collapsible bellows-like dispensing container 10. A variety of flexible or collapsible containers could be used.

While a number of embodiments have been described and illustrated for providing a sealing action between the sheath 28 and the valve body 14, it will be appreciated that other means can be used for providing such sealing action.

While specific embodiments of the invention have been shown and described in detail to illustrate the application of the inventive principles, it will be understood that the invention may be embodied otherwise without departing from such principles.

I claim:

1. Enclosing sleeve for one-way valve comprising an axially extending valve body having a first end and a second end spaced apart in the axial direction and arranged to be connected at the first end to a source of fluid to be dispensed, said valve body having a first outlet passageway extending from the first end for receiving fluid from the source and a second outlet passageway extending from the second end for discharging the fluid from said valve body after its passage through the first outlet passageway, said first and second outlet passageways being in spaced relation and free of direct communication therebetween, said valve body having an exterior surface, an elastomeric sheath laterally and tightly enclosing and in surface contact with the exterior surface of said valve body, said first and second outlet passageways being open to the interior of said sheath, an axially extending sleeve laterally enclosing and spaced radially outwardly from said elastomeric sheath at least in the region where said first and second outlet passageways are open to the interior of said sheath, and means for sealing said sheath to said valve body at locations positioned on opposite sides of and spaced from locations where said first and second outlet passageways open to the interior of said sheath with said means afforded at least in part by said sleeve, an axially extending annular space is located between said sleeve and said sheath and bounded in the axial direction by said means for sealing said sheath to said valve body, and means for venting the space between said sleeve and said sheath.

2. Enclosing sleeve, as set forth in claim 1, wherein said sealing means comprises O-rings encircling said sheath, said sleeve pressing said O-rings radially inwardly into sealing contact with said sheath for forming the seal between said sheath and said valve body.

3. Enclosing sleeve, as set forth in claim 2, wherein said valve body has an outside surface with annular grooves formed therein transversely of the axial direction for receiving said sheath pressed inwardly by said O-rings.

4. Enclosing sleeve, as set forth in claim 1, wherein said sealing means comprises that said sleeve having an inside surface facing said sheath with a pair of axially spaced annular protuberances extending inwardly from the inside surface of said sleeve into contact with said sheath for pressing said sheath into sealed contact with said valve body.

5. Enclosing sleeve, as set forth in claim 4, wherein said valve body has an outside surface with annular grooves formed therein for receiving said sheath pressed inwardly by said protuberances on said sleeve.

6. Enclosing sleeve, as set forth in claim 1, wherein said sleeve has a first end adjacent said first end of said valve body and a second end adjacent said second end of said valve body, and said sealing means comprises an annular protuberance on an inside surface of said sleeve adjacent the second end thereof with said protuberance pressing said sheath into sealing contact with said valve body, and a stopper encircling the first end of said valve body and pressing said sheath into sealing contact with said valve body.

7. Enclosing sleeve, as set forth in claim 6, wherein the first end of said sleeve bears in pressing contact with an adjacent surface of said stopper.

8. Enclosing sleeve, as set forth in claim 1, wherein said sleeve has a first end adjacent the first end of said valve body and a second end adjacent the second end of said valve body, said sealing means comprises an annular protuberance formed on and extending inwardly from an inside surface of said sleeve adjacent the second end thereof into pressing contact with said sheath for sealing said sheath against the outside surface of said valve body, a stopper encircling the first end of said valve body for securing said valve body in a container, said stopper projecting radially outwardly beyond said sleeve, said sheath having an end adjacent the first end of said valve body forming an outwardly projecting annular flange with said flange bearing against an radially outwardly extending surface on said stopper, and the first end of said sleeve being flanged radially outwardly and pressing the flanged end of said sheath into sealing contact with said stopper.

9. Enclosing sleeve, as set forth in claim 1, wherein said sleeve has a closed end adjacent and extending over said second end of said valve body, and means in said closed end for flowing fluid therethrough dispensed from the second end of said valve body.

10. Enclosing sleeve for one-way valve comprising an axially extending valve body arranged to be connected to a source of fluid to be dispensed, said valve body having a first end and a second end spaced apart in the axial direction and passageways for receiving fluid from the source at the first end and for discharging the fluid from the second end of said valve body, means in combination with said valve body permitting flow of fluid out of the valve body through said passageways and preventing flow through said passageways back into the source of fluid, said means including a sleeve enclosing and spaced outwardly from said valve body and having a closed end at the second end of said valve body forming a cover over the second end, and means in said cover for conveying fluid flowing from the second end of said valve body, said means in combination with said valve body comprises a sheath tightly enclosing and in surface contact with said valve body, an annular space located between said sleeve and said sheath, and an opening through said sleeve for venting the space between said sleeve and said sheath.

11. Enclosing sleeve, as set forth in claim 10, wherein said means in combination with said valve body comprises sealing means encircling said sheath and located between the first end and second end of said valve body, said sleeve pressing said sealing means radially inward into sealing contact with said sheath for forming a seal between said sheath and said valve body.

12. Enclosing sleeve as set forth in claim 11, wherein said valve body has an outside surface with annular grooves formed therein for receiving said sheath pressed inwardly by said sealing means.

13. Enclosing sleeve, as set forth in claim 10, wherein said means in combination with said valve body comprises a sheath enclosing said valve body between the first and second ends thereof, said sleeve having an inside surface facing said sheath with a pair of annular protuberances spaced apart in the direction between said first end and said second end and extending inwardly from the inside surface of said sleeve into contact with said sheath for pressing such sheath into sealed contact with said valve body.

14. Enclosing sleeve for one-way valve comprising an axially extending valve body having a first end and a second end spaced apart in the axial direction and arranged to be connected to a source of fluid to be dispensed, said valve body having a first outlet passage at the first end for receiving fluid from the source and a second outlet passage for discharging fluid from the second end of said valve body after passage through said first outlet passageway, said second outlet passageway having an outlet end for dispensing fluid from said valve body, said first and second outlet passageways being in spaced relation and free of direct communication therebetween, said valve body having an exterior surface, an elastomeric sheath laterally and tightly enclosing and in surface contact with the exterior surface of said valve body, said first and second outlet passageways being open to the interior of said sheath, an axially extending sleeve enclosing said elastomeric sheath at least in the region where said first and second outlet passageways are open to the interior of said sheath and also enclosing the second end of said valve body, said sleeve forming a cover over the second end of said valve body, and including means for flowing fluid dispensed from said second end of said valve body through said cover, and means for sealing said sheath to the exterior surface of said valve body at locations on opposite sides in the axial direction where said first and second passageways are open to the interior of said sheath, and means for venting an annular space bounded by said sheath and said cover between said means for sealing said sheath.

15. Enclosing sleeve, as set forth in claim 14, wherein said means for flowing fluid dispensed from said outlet end of said valve body comprises at least one opening through said cover.

16. Enclosing sleeve, as set forth in claim 15, wherein said opening in said cover is defined by an axially parallel surface.

17. Enclosing sleeve, as set forth in claim 15, wherein said cover having a first side adjacent said second end of said valve body and a second side more remote from the second end of said valve body, said opening extending between said sides and said opening being in divergent relationship from said first side to said second side.

18. Enclosing sleeve, as set forth in claim 15, wherein said cover having a first side adjacent said second end of said valve body and a second side more remote from the second end of said valve body, said opening extending between said sides and said opening being in convergent relationship from said first side to said second side.

19. Enclosing sleeve, as set forth in claim 15, wherein said cover having a plurality of openings therethrough for flowing fluid dispensed from said second end of said valve body.

20. Enclosing sleeve, as set forth in claim 14, wherein said sheath extends to adjacent said second end of said valve body into contact with a surface of said cover facing said second end of said valve body for preventing flow of fluid from said second end between said sleeve and said sheath.

21. Enclosing sleeve, as set forth in claim 14, wherein said means for sealing comprises annular protuberances formed on and extending inwardly from said sleeve into pressing contact with said sheath for sealing said sheath against the exterior surface of said valve body.

* * * * *

UNITED STATES PATENT AND TRADEMARK OFFICE
CERTIFICATE OF CORRECTION

PATENT NO.  : 5,092,855
DATED       : March 3, 1992
INVENTOR(S) : Greg Pardes

It is certified that error appears in the above-identified patent and that said Letters Patent is hereby corrected as shown below:

Column 2, line 13, delete ", and" and insert --;--.

Column 2, after line 5, insert

Figure 6A:
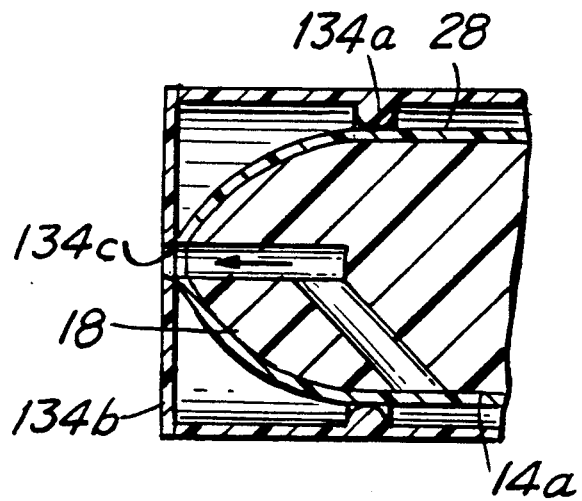
Figure 6B:
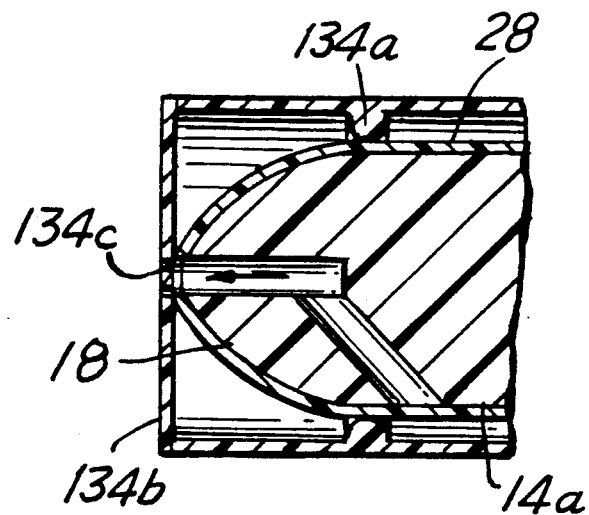

-- Fig. 6A is a partial axially extending sectional view, similar to Fig. 6, showing another embodiment of the sleeve cover;

Fig. 6B is a partial axially extending sectional view, similar to Fig. 6A, showing an alternate embodiment of the sleeve cover; and --.

Col. 5, line 20, after "convergent" insert -- as in Fig. 6A --.

Column 5, line 20, after "relation" insert -- as in Fig. 6B --.

Signed and Sealed this

Twenty-fourth Day of August, 1993

Attest:

BRUCE LEHMAN

*Attesting Officer*     *Commissioner of Patents and Trademarks*